(12) United States Patent
Caruso et al.

(10) Patent No.: US 9,816,482 B2
(45) Date of Patent: Nov. 14, 2017

(54) SPAR CAP FOR A WIND TURBINE ROTOR BLADE

(71) Applicant: General Electric Company, Schenectady, NY (US)

(72) Inventors: Christopher Daniel Caruso, Greenville, SC (US); Aaron A. Yarbrough, Clemson, SC (US); Richard Allen Hardison, Greenville, SC (US)

(73) Assignee: General Electric Company, Schenectady, NY (US)

( * ) Notice: Subject to any disclaimer, the term of this patent is extended or adjusted under 35 U.S.C. 154(b) by 304 days.

(21) Appl. No.: 14/542,850

(22) Filed: Nov. 17, 2014

(65) Prior Publication Data

US 2016/0138569 A1  May 19, 2016

(51) Int. Cl.
*F03D 1/06* (2006.01)
*F03D 13/20* (2016.01)
*F03D 80/30* (2016.01)

(52) U.S. Cl.
CPC ......... *F03D 1/0675* (2013.01); *F03D 1/0633* (2013.01); *F03D 13/20* (2016.05); *F03D 80/30* (2016.05); *Y02E 10/721* (2013.01)

(58) Field of Classification Search
CPC ...... F03D 1/003; F03D 1/0633; F03D 1/0675; F03D 11/0033; F03D 11/04; F03D 80/00; F03D 80/30
See application file for complete search history.

(56) References Cited

U.S. PATENT DOCUMENTS

| 6,457,943 | B1 | 10/2002 | Olsen et al. |
| 6,612,810 | B1 | 9/2003 | Olsen et al. |
| 7,249,935 | B2 | 7/2007 | Pedersen |
| 7,494,324 | B2 * | 2/2009 | Hibbard ............ H02G 13/00 416/226 |
| 7,651,320 | B2 * | 1/2010 | Hansen ............. H02G 13/00 416/1 |
| 7,792,100 | B2 | 6/2010 | Gonzalez et al. |
| 8,105,035 | B2 | 1/2012 | Bertelsen |

(Continued)

FOREIGN PATENT DOCUMENTS

| EP | 0580417 A1 | 1/1994 | |
| EP | 1830063 A1 | 9/2007 | |
| JP | WO 2013084370 A1 * | 6/2013 | ............ H02G 13/00 |

OTHER PUBLICATIONS

European Search Report and Opinion issued in connection with corresponding EP Application No. 15194915.3 dated Mar. 29, 2016.

*Primary Examiner* — Woody Lee, Jr.
*Assistant Examiner* — Eric Zamora Alvarez
(74) *Attorney, Agent, or Firm* — Dority & Manning, P.A.

(57) ABSTRACT

A spar cap for a rotor blade of a wind turbine is disclosed. The rotor blade includes a blade root and a blade tip, leading and trailing edges, pressure and suction sides, and at least one spar cap configured on an internal surface of either or both the pressure or suction sides. The spar cap includes one or more layers of a first material and a second conductive material contacting at least one of the layers of the first material. Further, the conductive material is different than the first material. Thus, the conductive material is configured with the first material so as to create an equipotential spar cap.

18 Claims, 5 Drawing Sheets

(56) References Cited

U.S. PATENT DOCUMENTS

| | | |
|---|---|---|
| 8,118,559 B2 * | 2/2012 | Llorente Gonzalez . F03D 1/065 |
| | | 416/226 |
| 8,137,074 B2 | 3/2012 | Mendez Hernandez et al. |
| 8,540,491 B2 * | 9/2013 | Gruhn .................... B29B 11/16 |
| | | 416/230 |
| 8,657,582 B2 * | 2/2014 | Hibbard .................. F03D 80/30 |
| | | 416/229 R |
| 2007/0074892 A1 | 4/2007 | Hibbard |
| 2010/0134946 A1 | 6/2010 | Narasimalu et al. |
| 2011/0020134 A1 | 1/2011 | Jensen et al. |
| 2011/0189025 A1 | 8/2011 | Hancock et al. |
| 2012/0064788 A1 * | 3/2012 | Peters .................... B29C 70/22 |
| | | 442/173 |
| 2012/0134826 A1 | 5/2012 | Arocena de la Rua et al. |
| 2013/0149153 A1 | 6/2013 | Fujioka et al. |

\* cited by examiner

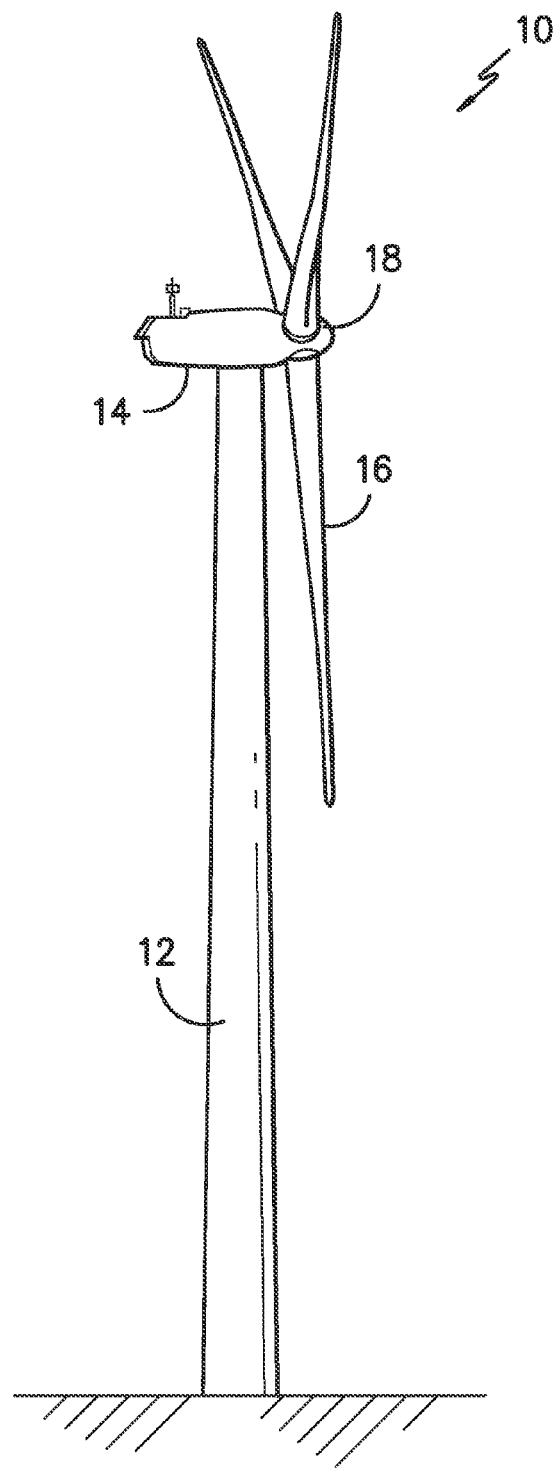
FIG. -1-

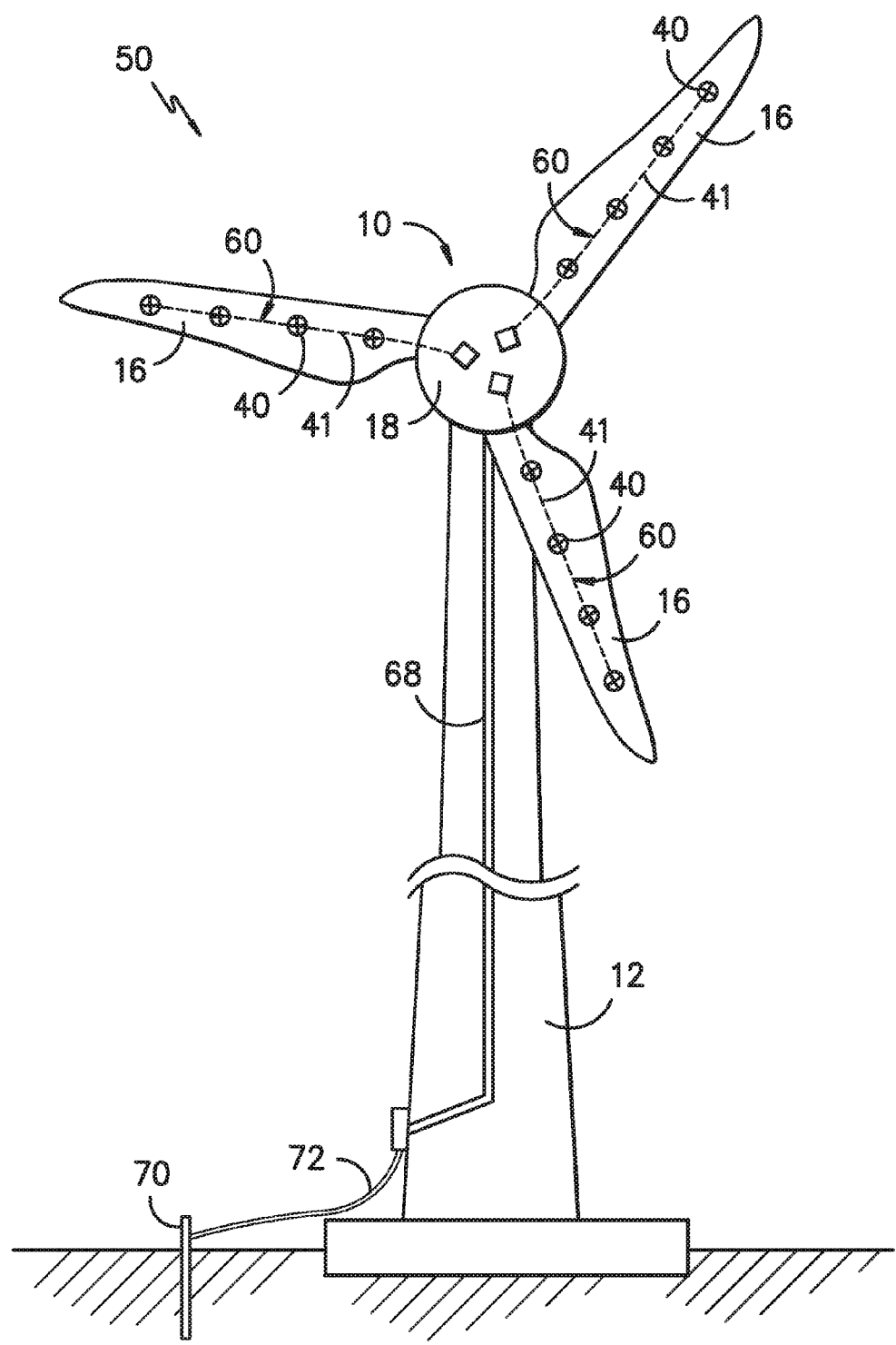
FIG. -2-

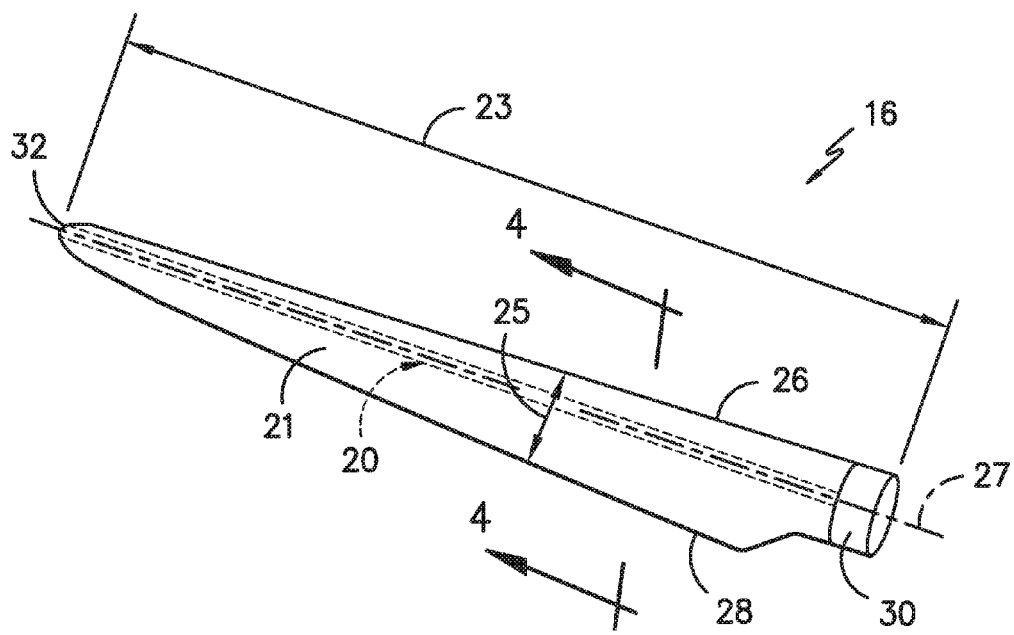
FIG. -3-
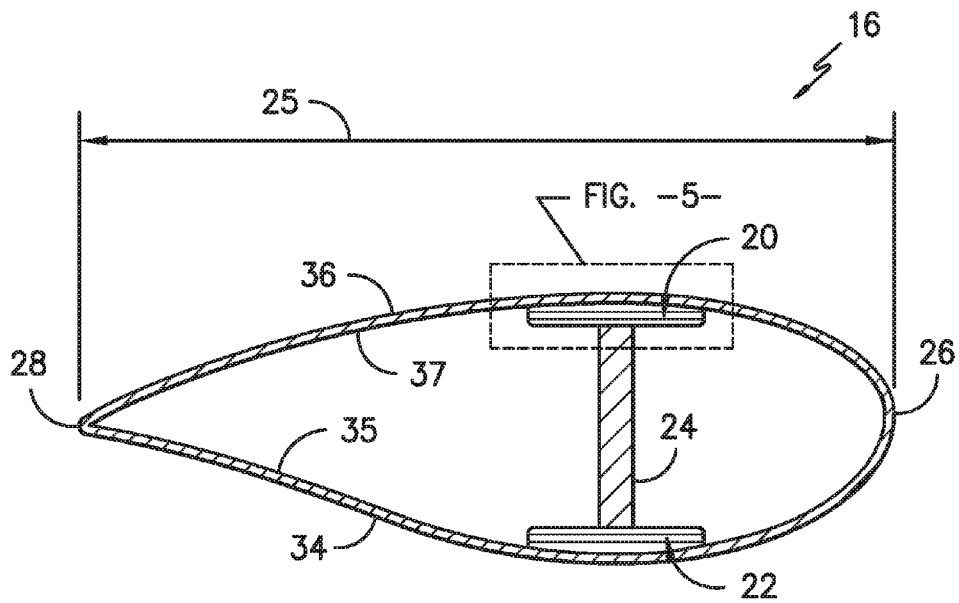
FIG. -4-

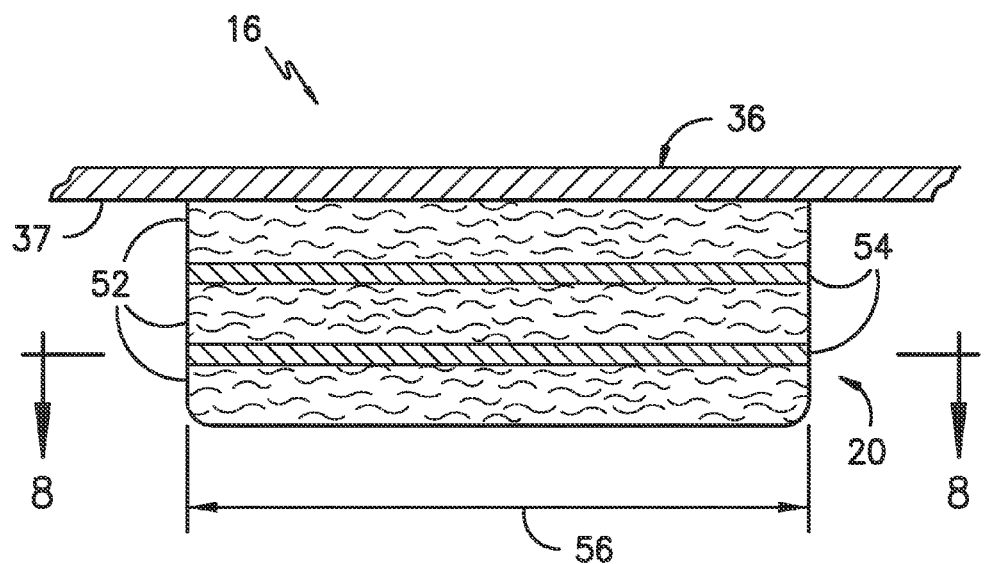
FIG. -5-
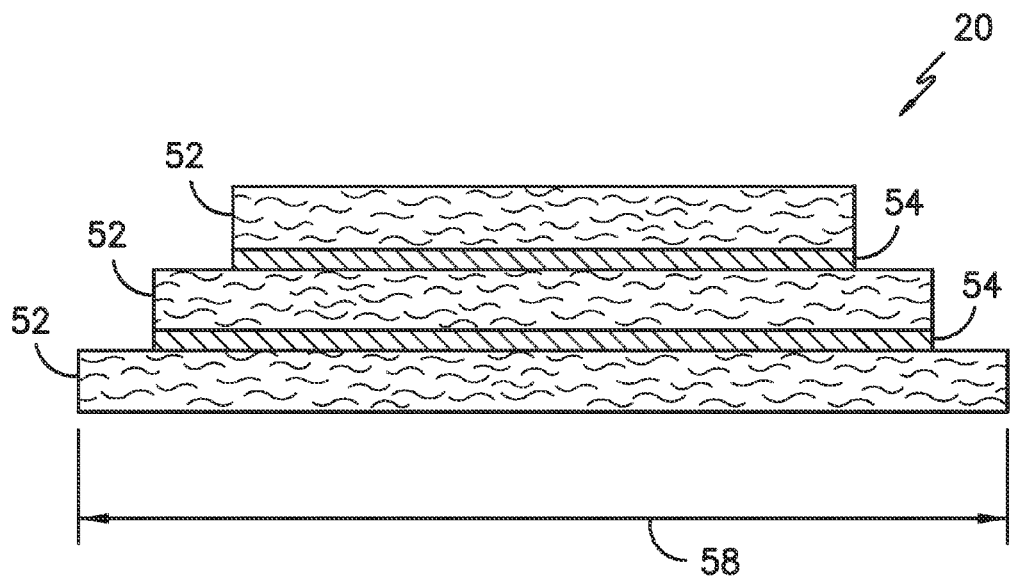
FIG. -6-

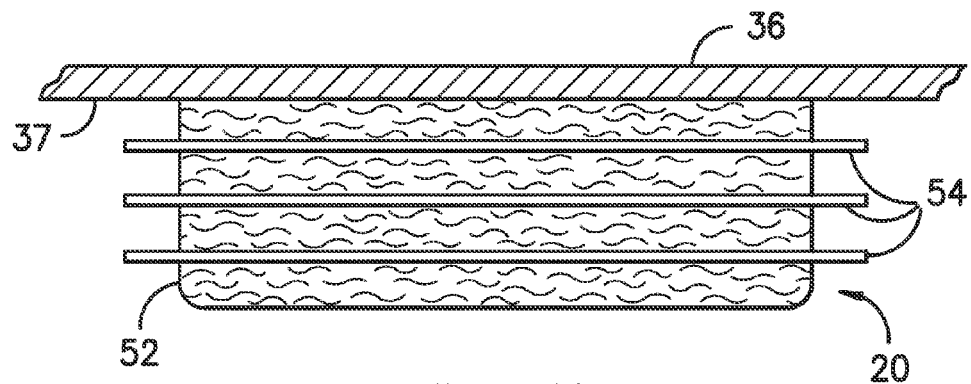
FIG. -7-
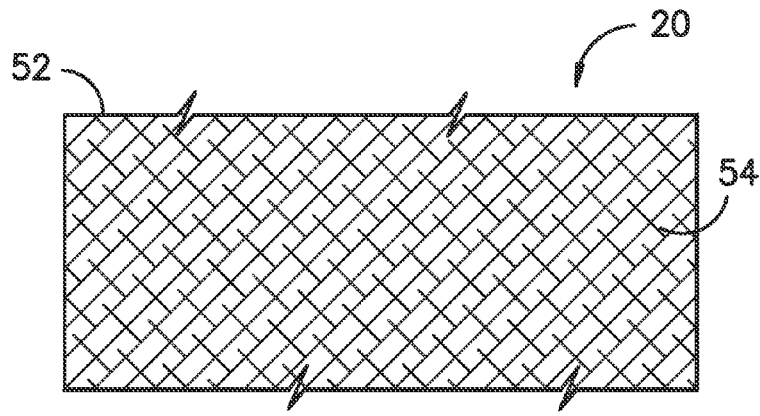
FIG. -8-
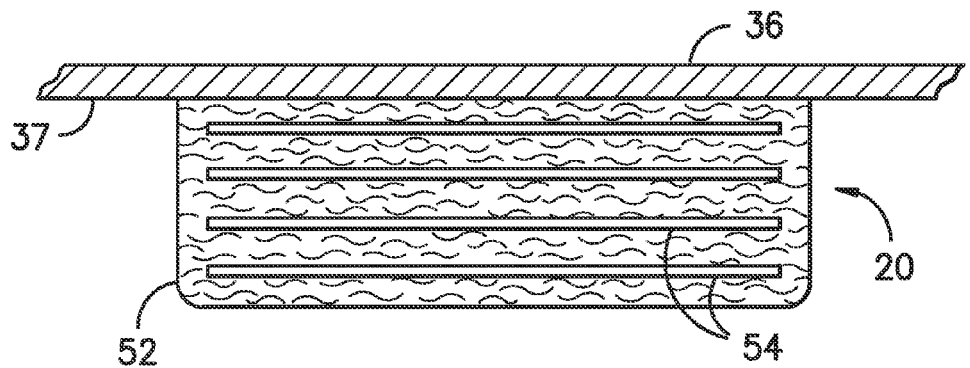
FIG. -9-

SPAR CAP FOR A WIND TURBINE ROTOR BLADE

FIELD OF THE INVENTION

The present subject matter relates generally to rotor blades for a wind turbine and, more particularly, to a spar cap for a rotor blade having conductive layers.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades generally include a body shell formed by two shell halves of a composite laminate material. The shell halves are generally manufactured using molding processes and then coupled together along the corresponding edges of the rotor blade. In general, the body shell is relatively lightweight and has structural properties (e.g., stiffness, buckling resistance and strength) which are not configured to withstand the bending moments and other loads exerted on the rotor bade during operation. To increase the stiffness, buckling resistance and strength of the rotor blade, the body shell is typically reinforced using spar caps that engage the inner surfaces of the shell halves. The spar caps may be constructed of various materials, including but not limited to glass fiber laminate composites and/or carbon fiber laminate composites.

During the life of the wind turbine, the rotor blades are particularly prone to lightning strikes. Thus, modern wind turbines typically include a lightning protection system having one or more lightning receptors disposed on the exterior of the rotor blades and a lightning conductor or cable wire coupled to the lightning receptor(s) and extending through the rotor blades from a blade tip to a blade root and through other components until grounded down through the tower to a ground location. Accordingly, when lightning strikes the rotor blade, the electrical current may flow through the lightning receptor(s) and may be conducted through the lightning system to the ground. However, when a lightning strike occurs, unwanted discharges may arise from the spar caps to the body shell, which may cause significant damage to the rotor blade.

Accordingly, there is a need for a spar cap design that prevents such unwanted discharges from the spar caps. More specifically, a spar cap constructed with alternating layers of conductive material so as to electrically connect the layers of the spar cap to the lightning protection system would be welcomed in the art.

BRIEF DESCRIPTION OF THE INVENTION

Aspects and advantages of the invention will be set forth in part in the following description, or may be obvious from the description, or may be learned through practice of the invention.

In one aspect of the present disclosure, a rotor blade of a wind turbine is disclosed. The rotor blade includes a blade root and a blade tip, leading and trailing edges, pressure and suction sides, and at least one spar cap configured on an internal surface of either or both the pressure or suction sides. The spar cap includes one or more layers of a first material and a second conductive material contacting at least one of the layers of the first material. Further, the conductive material is different than the first material. Thus, the conductive material is configured with the first material so as to create an equipotential spar cap.

In one embodiment, the spar cap may contain alternating layers of the first material and the conductive material. In various embodiments, the layers of first material may include glass fiber laminate composites, carbon fiber laminate composites, and/or pre-preg fiber composites. More specifically, in a particular embodiment, if the spar caps are constructed of carbon fiber laminate composites, the conductive material may be placed between certain layers of the carbon plies. Alternatively, the conductive material may be absent between some layers of first material and/or present in others, e.g. every third layer. In another embodiment, the conductive material may be embedded within one or more of the layers of the first material, e.g. where the spar caps are constructed of pre-preg composite fibers.

In still further embodiments, the conductive material may contain at least one metal or metal alloy. More specifically, in particular embodiments, the metal or metal alloy may contain at least one of copper, aluminum, steel, tin, tungsten, iron, nickel, or combinations thereof, or any other suitable metal. In addition, the conductive material may include any of the following configurations: a mesh, a wire, a ply, or any combinations thereof.

In yet another embodiment, the layers of the first material and the conductive material may have varying lengths along a length of the spar cap. Thus, the layers of first material and conductive material may extend along the entire span of the rotor blade or along only a portion of the rotor blade. Further, in additional embodiments, the layers of the first material and the conductive material may have uniform lengths along a width of the spar cap.

In yet another aspect, the present disclosure is directed to a wind turbine. The wind turbine includes a tower mounted on a support surface, a nacelle configured atop the tower, and a rotor hub having one or more rotor blades. At least one of the rotor blades has one or more spar caps configured on an internal surface of at least one of a pressure side or a suction side of the rotor blade. Further, the spar cap includes one or more layers of a first material and a second conductive material contacting at least one of the layers of the first material, the conductive material being different than the first material. Thus, the conductive material is configured with the first material so as to create an equipotential spar cap. It should also be understood that the wind turbine may further include any of the additional features as described herein.

In still another aspect, the present disclosure is directed to a method of manufacturing a spar cap for a rotor blade of a wind turbine. The method includes providing one or more layers of a first material of the spar cap. Another step includes placing a second conductive material adjacent to at least one of the layers of the first material, wherein the conductive material is different than the first material. Thus, the conductive material is configured with the first material so as to create an equipotential spar cap.

In another embodiment, the step of placing the second conductive material so as to contact at least one of the layers of first material may further include alternating the conductive material with the one or more layers of first material. In further embodiments containing pre-preg composite fibers, the method may also include embedding the conductive material within the pre-preg composite fibers. It should also be understood that the method may further include any of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of another embodiment of a wind turbine, particularly illustrating a lightning protection system configured therewith according to the present disclosure;

FIG. 3 illustrates a perspective view of a rotor blade according to the present disclosure;

FIG. 4 illustrates a cross-sectional view of the rotor blade of FIG. 3 along line 4-4;

FIG. 5 illustrates a detailed view of the spar cap of FIG. 4;

FIG. 6 illustrates a side view of one embodiment of a spar cap along a length thereof according to the present disclosure;

FIG. 7 illustrates another detailed view of one embodiment of a spar cap according to the present disclosure;

FIG. 8 illustrates a cross-sectional view of the spar cap of FIG. 5 along line 8-8; and FIG. 9 illustrates a cross-sectional view of another embodiment of a spar cap according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a spar cap of a rotor blade of a wind turbine having one or more conductive layers. More specifically, the spar cap includes one or more layers of a first material and one or more layers of a second conductive material that contacts at least one of the layers of first material. Further, the conductive material is different than the first material. The conductive material is configured with the first material so as to create an equipotential spar cap. As used herein, the term "equipotential" or "equipotentially" or similar generally refers to an object where every point in the object is at the same potential. For example, if certain points within or at the surface of the spar cap contain no flow of charge between the points, then the potential difference between the points is zero. In such an illustration, the spar cap would be equipotential, as all points in the spar cap have the same potential.

The present disclosure provides many advantages not present in the prior art. For example, if the first material contains carbon, the spar caps can be very anisotropic without the addition of the conductive material. By including the conductive material, the resulting conductivity of the carbon spar caps is more isotropic, allowing current transfer through the thickness and transverse to the fibers. Thus, the spar caps of the present disclosure help reduce undesired discharges or arcs from the carbon spar caps to the blade which would otherwise cause significant damage, e.g. debonding between the layers.

Referring now to the drawings, FIG. 1 illustrates a perspective view of a horizontal axis wind turbine 10. It should be appreciated that the wind turbine 10 may also be a vertical-axis wind turbine. As shown in the illustrated embodiment, the wind turbine 10 includes a tower 12, a nacelle 14 mounted on the tower 12, and a rotor hub 18 that is coupled to the nacelle 14. The tower 12 may be fabricated from tubular steel or other suitable material. The rotor hub 18 includes one or more rotor blades 16 coupled to and extending radially outward from the hub 18. As shown, the rotor hub 18 includes three rotor blades 16. However, in an alternative embodiment, the rotor hub 18 may include more or less than three rotor blades 16. The rotor blades 16 rotate the rotor hub 18 to enable kinetic energy to be transferred from the wind into usable mechanical energy, and subsequently, electrical energy. Specifically, the hub 18 may be rotatably coupled to an electric generator (not illustrated) positioned within the nacelle 14 for production of electrical energy.

Referring to FIG. 2, a perspective view of one embodiment of a wind turbine 10 having a lightning protection system 50 configured thereon is illustrated. As shown, the lightning protection system 50 includes at least one rotor blade 16 having a plurality of lightning receptors 40 configured thereon. Further, each of the rotor blades 16 may be configured in a similar manner. For example, as shown, each rotor blade 16 includes a conductive circuit 60 having a plurality of lightning receptors 40 connected via one or more lightning conductors 41 within an internal cavity of the rotor blade 16. The respective lightning conductive circuits 60 for each of the rotor blades 16 include terminal ends that extend through the root portion of the rotor blades 16 and are individually connected to a grounding system within the rotor hub 18. The grounding system may be variously configured, as is well known in the art. For example, the grounding system may include any conductive path defined by the wind turbine's machinery or support structure, including blade bearings, machinery bed plates, tower structure, and the like, that defines any suitable ground conductive path 68 from the blades 16, through the tower 12, to a ground rod 70 via a ground cable 72, or other suitable electrical ground path.

Referring now to FIGS. 3 and 4, one of the rotor blades 16 of FIG. 2 is illustrated in accordance with aspects of the present subject matter. In particular, FIG. 3 illustrates a perspective view of the rotor blade 16, whereas FIG. 4 illustrates a cross-sectional view of the rotor blade 16 along the sectional line 4-4 shown in FIG. 3. As shown, the rotor blade 16 generally includes a blade root 30 configured to be mounted or otherwise secured to the hub 18 (FIG. 1) of the wind turbine 10 and a blade tip 32 disposed opposite the blade root 30. A body shell 21 of the rotor blade generally extends between the blade root 30 and the blade tip 32 along a longitudinal axis 27. The body shell 21 may generally serve as the outer casing/covering of the rotor blade 16 and may define a substantially aerodynamic profile, such as by defining a symmetrical or cambered airfoil-shaped cross-section. The body shell 21 may also define a pressure side 34 and a suction side 36 extending between leading and trailing edges 26, 28 of the rotor blade 16. Further, the rotor blade 16 may also have a span 23 defining the total length between the blade root 30 and the blade tip 32 and a chord 25 defining the total length between the leading edge 26 and the trialing edge 28. As is generally understood, the chord 25 may generally vary in length with respect to the span 23 as the rotor blade 16 extends from the blade root 30 to the blade tip 32.

In several embodiments, the body shell 21 of the rotor blade 16 may be formed as a single, unitary component. Alternatively, the body shell 21 may be formed from a plurality of shell components. For example, the body shell 21 may be manufactured from a first shell half generally defining the pressure side 34 of the rotor blade 16 and a second shell half generally defining the suction side 36 of the rotor blade 16, with such shell halves being secured to one another at the leading and trailing edges 26, 28 of the blade 16. Additionally, the body shell 21 may generally be formed from any suitable material. For instance, in one embodiment, the body shell 21 may be formed entirely from a laminate composite material, such as a carbon fiber reinforced laminate composite or a glass fiber reinforced laminate composite. Alternatively, one or more portions of the body shell 21 may be configured as a layered construction and may include a core material, formed from a lightweight material such as wood (e.g., balsa), foam (e.g., extruded polystyrene foam) or a combination of such materials, disposed between layers of laminate composite material.

Referring particularly to FIG. 4, the rotor blade 16 may also include one or more longitudinally extending structural components configured to provide increased stiffness, buckling resistance and/or strength to the rotor blade 16. For example, the rotor blade 16 may include a pair of longitudinally extending spar caps 20, 22 configured to be engaged against the opposing inner surfaces 35, 37 of the pressure and suction sides 34, 36 of the rotor blade 16, respectively. Additionally, one or more shear webs 24 may be disposed between the spar caps 20, 22 so as to form a beam-like configuration. The spar caps 20, 22 may generally be designed to control the bending stresses and/or other loads acting on the rotor blade 16 in a generally spanwise direction (a direction parallel to the span 23 of the rotor blade 16) during operation of a wind turbine 10. Similarly, the spar caps 20, 22 may also be designed to withstand the spanwise compression occurring during operation of the wind turbine 10.

In general, as shown in FIGS. 5-9, the spar caps 20, 22 includes one or more layers 52 of a first material and at least one conductive material 54 contacting at least one of the layers 52 of the first material. More specifically, FIG. 5 illustrates a detailed cross-sectional view of the suction side 36 of the spar cap 20 of FIG. 4 along the spar width 56, whereas FIG. 6 illustrates the spar cap 20 along a spar length 58 (i.e. along the span 23 of the rotor blade 16). FIGS. 7-9 illustrate various embodiments of the conductive material 54 of the spar cap 20 according to the present disclosure.

The first material 52 of the spar caps 20, 22 may be formed from any suitable composite material that has material properties (e.g., strengths and/or moduli of elasticity). Additionally, the spar caps 20, 22 may generally be formed from the same composite material 52. Thus, in several embodiments of the present subject matter, both spar caps 20, 22 may be formed from any suitable laminate composite material which has a tensile strength and/or modulus of elasticity that varies from the composite's compressive strength and/or modulus of elasticity. Suitable laminate composite materials may include laminate composites reinforced with carbon, mixtures of carbon, fiberglass, mixtures of fiberglass, mixtures of carbon and fiberglass and any other suitable reinforcement material and mixtures thereof. For example, in a particular embodiment of the present subject matter, both spar caps 20, 22 may be formed from a carbon fiber reinforced laminate composite.

The conductive material 54 is a different material than the layers of first material 52 and may be any appropriate conductive material that is suitable for preventing unwanted discharges or arcs from the spar caps 20, 22 to the rotor blade 16 which would otherwise cause significant structural damage. For example, in certain embodiments, the conductive material 54 may include a metal or metal alloy, such as copper, aluminum, steel, tin, tungsten, iron, nickel, or combinations thereof. By including the conductive layers 54, the resulting conductivity of the spar caps 20, 22 is more isotropic, allowing current transfer through the thickness of the spar caps 20, 22 and transverse to the fibers.

It should be understood that the spar cap 20 may include any number and/or configuration of layers of first material 52 and conductive layers 54. For example, as shown, the spar cap 20 includes three layers of first material 52 and two layers of conductive material 54. In additional embodiments, the spar cap 20 may include more than three or less than three layers of first material 52 or more than two or less than two layers of conductive material 54. Further, as shown, the spar caps 20, 22 may include alternating layers of the first material 52 and the conductive material 54. Alternatively, the conductive material 54 may be absent between or within some layers of first material 52 (e.g. between every other layer or every third layer, etc.). Further, the conductive material 54 may include layers of material (e.g. plies), a mesh, a wire, or any other suitable configuration. In addition, the conductive material 54 can be implemented along the entire span 23 of the rotor blade 16, segmented patches along the span 23, or some percentage of the span 23. Thus, the number of layers and/or configuration of the conductive material 54 is configured to electrically connect the layers 52 of the first material of the spar cap 20 to a lightning protection system 50 of the wind turbine 10 (e.g. via the lightning conductor 41).

Referring particularly to FIGS. 5, 7, and 9, the conductive material 54 can be the same width as spar cap 20, narrower than the spar cap 20, or wider than the spar cap 20. More specifically, as shown in FIG. 5, the conductive material 54 may be substantially the same width as the width 56 of the spar cap 20. In contrast, as shown in FIG. 7, the conductive material 54 may be wider than the width 56 of the spar cap 20 (e.g. when the conductive material 54 contains one or more wires). Further, as shown in FIG. 9, the conductive material 54 may be narrower than the width 56 of the spar cap 20 (e.g. when the conductive material 54 is embedded within the first material 52). In still further embodiments, as shown in FIG. 6, the layers of the first material 52 and the conductive material 54 may include varying lengths along a length 58 of the spar cap 20.

In addition, the width of the conductive material 54 may be a function of the manufacturing method used to construct the spar cap. For example, as shown in FIG. 9, the conductive material 54 may be embedded within the first material 52 due to placing the conductive material 54 within a mold and/or forming conductive layers into pre-preg materials during the curing process. In addition, the conductive material 54 can be incorporated in to a glass or carbon veil or a dry fabric. As used herein, pre-preg materials refer generally to "pre-mpregnated" composite fibers where a matrix material is already present. The composite fibers often take the form of a weave and the matrix is used to bond the fibers together and to other components during manufacture. The matrix is only partially cured to allow easy handling, therefore, the conductive material 54 may be inserted into the matrix before it is cured such that the spar cap 20 may be cured as one part, with the conductive material 54 cured therein.

The present disclosure is also directed to methods for manufacturing spar caps as described herein. For example, in one embodiment, the method may include providing one or more layers of a first material, e.g. glass, carbon, or pre-preg fiber laminate composites. Thus, the method may also include placing a second conductive material adjacent to or within at least one of the layers of the first material. For example, in one embodiment, the method may include alternating the conductive material between one or more of the layers of first material. Alternatively, in embodiments containing pre-preg composite fibers, the method may include embedding the conductive material within the pre-preg composite fibers before the spar cap is cured. Thus, the methods described herein provide a spar cap containing conductive material configured therein that equipotentially connects all of the layers of the spar cap such that the spar cap can be electrically connected to a lightning protection system of the wind turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade of a wind turbine, the rotor blade comprising:
    a blade root and a blade tip;
    a leading edge and a trailing edge;
    a suction side and a pressure side; and,
    at least one spar cap configured on an internal surface of either or both of the pressure or suction sides, the spar cap constructed of a plurality of layers of a non-metal, first material and a plurality of layers of a conductive, second material alternating with and contacting each of the layers of the first material, the plurality of layers of the second materials being embedded between the layers of the first material to form the spar cap, the second material being a different material than the first material,
    wherein one of the plurality of layers of the non-metal, first material contacts the internal surface of either or both of the pressure or suction sides of the rotor blade, and
    wherein the second material is configured with the first material so as to create an equipotential spar cap.

2. The rotor blade of claim 1, wherein the second material of the spar cap is configured to electrically connect to a lightning protection system of the wind turbine.

3. The rotor blade of claim 1, wherein some of the second material is embedded within one or more of the layers of the first material.

4. The rotor blade of claim 1, wherein the second material comprises at least one of a metal or a metal alloy.

5. The rotor blade of claim 4, wherein the metal or metal alloy comprises at least one of copper, aluminum, steel, tin, tungsten, iron, nickel, or combinations thereof.

6. The rotor blade of claim 1, wherein the second material comprises at least one of the following configurations: a mesh, a wire, or a ply.

7. The rotor blade of claim 1, wherein the layers of the non-metal, first material comprise at least one of glass fiber laminate composites, carbon fiber laminate composites, or pre-preg fiber composites.

8. The rotor blade of claim 1, wherein the layers of the first material and the second material comprise varying lengths along a length of the spar cap.

9. The rotor blade of claim 1, wherein the layers of the first material and the second material comprise uniform lengths along a spar width.

10. A wind turbine, comprising:
    a tower mounted on a support surface;
    a nacelle configured atop the tower;
    a rotor hub comprising one or more rotor blades, at least one of the rotor blades comprising at least one spar cap configured on an internal surface of at least one of a pressure side or a suction side of the rotor blade, the spar cap comprising a plurality of layers of a non-metal, first material and a plurality of layers of a conductive, second material alternating with and adjacent to each of the layers of the first material, the plurality of layers of the second materials being embedded between the layers of the first material to form the spar cap, the second material being different than the first material,
    wherein one of the plurality of layers of the non-metal, first material contacts the internal surface of either or both of the pressure or suction sides of the rotor blade, and
    wherein the second material is configured with the first material so as to create an equipotential spar cap.

11. A method of manufacturing a spar cap for a rotor blade of a wind turbine, the method comprising:
    providing a plurality of layers of a non-metal, first material of the spar cap, at least one of the plurality of layers of the non-metal first material forming an outer surface of the spar cap that contacts an internal surface of either or both of the pressure or suction sides of the rotor blade;
    alternating a plurality of layers of a conductive, second material with each of the plurality of layers of the first material, the second material being different than the first material; and,
    securing the plurality of layers of the first material and the plurality of layers of the second material together such that the layers of the second material are embedded between the layers of the first material so as to create an equipotential spar cap structure.

12. The method of claim 11, wherein the layers of the non-metal, first material comprise at least one of glass fiber laminate composites, carbon fiber laminate composites, or pre-preg fiber composites.

13. The method of claim 12, further comprising embedding some of the second material within the pre-preg fiber composites.

14. The method of claim 11, wherein the second material comprises at least one metal or metal alloy.

15. The method of claim 14, wherein the metal comprises at least one of copper, aluminum, steel, tin, tungsten, iron, nickel, or combinations thereof.

16. The method of claim 11, wherein the second material comprises at least one of the following configurations: a mesh, a wire, or a ply.

17. The method of claim 11, wherein the layers of the first material and the second material comprise varying lengths along a length of the spar cap.

18. The method of claim 11, wherein the layers of the first material and the second material comprise uniform lengths along a spar width.

\* \* \* \* \*